US009197851B2

(12) United States Patent
Jeong et al.

(10) Patent No.: US 9,197,851 B2
(45) Date of Patent: Nov. 24, 2015

(54) APPARATUS AND METHOD FOR MODULATING IMAGES FOR VIDEOTELEPHONY

(71) Applicant: Electronics and Telecommunications Research Institute, Daejeon (KR)

(72) Inventors: Chi Yoon Jeong, Daejeon (KR); Moo Seop Kim, Daejeon (KR); SuGil Choi, Daejeon (KR); Sooncheol Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 71 days.

(21) Appl. No.: 14/101,950

(22) Filed: Dec. 10, 2013

(65) Prior Publication Data

US 2014/0160228 A1 Jun. 12, 2014

(30) Foreign Application Priority Data

Dec. 10, 2012 (KR) .................. 10-2012-0142581

(51) Int. Cl.
  *H04N 7/14* (2006.01)
(52) U.S. Cl.
  CPC .................................... *H04N 7/147* (2013.01)
(58) Field of Classification Search
  CPC ........................... H04N 7/147; G06K 9/00711
  USPC ............... 345/156; 348/14.03, 14.05, 14.07, 348/14.12, 159, 345, 14.02; 375/240.26; 707/687; 713/189; 726/23, 12; 370/252; 382/260; 706/46; 709/224
  See application file for complete search history.

(56) References Cited

U.S. PATENT DOCUMENTS

| | | | | |
|---|---|---|---|---|
| 7,796,828 | B2 * | 9/2010 | Han et al. ...................... | 382/260 |
| 7,982,762 | B2 * | 7/2011 | Chatting et al. ........... | 348/14.07 |
| 8,014,310 | B2 * | 9/2011 | Chang et al. .................. | 370/252 |
| 8,019,865 | B2 * | 9/2011 | Chang et al. .................. | 709/224 |
| 8,054,328 | B2 * | 11/2011 | Shiue et al. ................. | 348/14.05 |
| 8,140,671 | B2 * | 3/2012 | Jeong et al. ................... | 709/224 |
| 8,184,196 | B2 * | 5/2012 | Forutanpour ................ | 348/345 |
| 8,307,441 | B2 * | 11/2012 | Kim et al. ....................... | 726/23 |
| 8,341,721 | B2 * | 12/2012 | Kim et al. ....................... | 726/12 |
| 8,391,484 | B2 | 3/2013 | Kwon et al. | |
| 8,502,857 | B2 * | 8/2013 | Halavy ...................... | 348/14.03 |
| 8,681,200 | B2 * | 3/2014 | Choi et al. ................ | 348/14.02 |
| 8,965,823 | B2 * | 2/2015 | Sohn et al. ..................... | 706/46 |
| 2011/0016525 | A1 * | 1/2011 | Jeong et al. ..................... | 726/23 |
| 2012/0117034 | A1 * | 5/2012 | Jeong et al. .................. | 707/687 |
| 2013/0050496 | A1 * | 2/2013 | Jeong .......................... | 348/159 |
| 2013/0094593 | A1 * | 4/2013 | Huang et al. ............ | 375/240.26 |
| 2013/0234928 | A1 * | 9/2013 | Jeong .......................... | 345/156 |
| 2013/0283061 | A1 * | 10/2013 | Jeong .......................... | 713/189 |
| 2014/0160228 | A1 * | 6/2014 | Jeong et al. ............... | 348/14.12 |

FOREIGN PATENT DOCUMENTS

| | | |
|---|---|---|
| JP | 2006211001 A | 8/2006 |
| KR | 100469694 B1 | 1/2005 |
| KR | 1020100048019 A | 5/2010 |
| KR | 1020100061228 A | 6/2010 |

* cited by examiner

*Primary Examiner* — Gerald Gauthier
(74) *Attorney, Agent, or Firm* — William Park & Associates Ltd.

(57) ABSTRACT

A videotelephony image modulation apparatus and method detects an event having a possibility of information leakage by analyzing an image and provides a secured calling mode of masking all or a part of the image and transmitting a masked image obtained through the masking.

12 Claims, 11 Drawing Sheets

APPARATUS AND METHOD FOR MODULATING IMAGES FOR VIDEOTELEPHONY

RELATED APPLICATIONS(S)

This application claims the benefit of Korean Patent Application No. 10-2012-0142581, filed on 10 Dec. 2012, which is hereby incorporated by references as if fully set forth herein.

FIELD OF THE INVENTION

The present invention relates to an apparatus and method for modulating an image for videotelephony, and more particularly, to an apparatus and method for modulating video (image) for videotelephony, which detects an event having a possibility of information leakage by analyzing the image and provides a secured calling mode of masking all or a part of the image and transmitting a masked image obtained through the masking.

BACKGROUND OF THE INVENTION

Recently, a portable terminal having a front side and a back side on which cameras are built is on the market. As a technology of transmitting data between portable terminals is rapidly changing, videotelephony through which users speak to each other while seeing their faces using cameras built in the portable terminals is becoming more common.

The videotelephony has an advantage of giving familiarity since it is possible to see an opposite party, but it is vulnerable to the security since all images recognized by a camera are exposed to the opposite party. In particular, in an area, such as military facilities or industrial facilities, where the security is required, important information may be leaked through the videotelephony. In addition, in case that another person who is not a person talking on a videophone sees the opposite party during the videotelephony, personal information of the opposite party may be exposed.

SUMMARY OF THE INVENTION

It is, therefore, an object of the present invention to provide an apparatus and method for modulating images for videotelephony, which is able to provide a secured calling mode for preventing information leakage by analyzing image information transmitted during the videotelephony and masking unnecessary information except information of an opposite party.

In accordance with an aspect of the present invention, there is provided an apparatus for modulating images for videotelephony, the apparatus including a sensor image matching unit configured to collect an image from at least one sensor or camera and generate image information, an image analysis unit configured to analyze the image information and generate object and background region information, a calling mode determination unit configured to detect an event using the object and background region information and determine a calling mode based on the event, and an image modulation unit configured to modulate the image according to the calling mode and generate a modulated image.

The calling mode determination unit may determine the calling mode according to a degree of risk of the event or a security policy that is predetermined. The calling mode may include any of a videotelephony mode of performing calling with the image, a privacy calling mode of performing calling with a modulated image where a background region is masked, an all secured calling mode of performing calling with a modulated image where all regions of the image are masked, a partially secured calling mode of performing calling with a modulated image where a part of the background region is masked, a voice calling mode, and a call ending mode.

The calling mode determination unit may set up one of the videotelephony mode and the privacy calling mode as a basic calling mode. The calling mode determination unit may change the basic calling mode to one of the videotelephony mode, the privacy calling mode, the all secured calling mode, the partially secured calling mode, the voice calling mode, and the call ending mode, according to the event.

In accordance with another aspect of the present invention, there is provided a method of modulating images for videotelephony, the method including starting the videotelephony, collecting an image from at least one sensor or camera and generating image information, analyzing the image information and generating object and background region information, determining whether or not an event occurs using the object and background region information, determining a calling mode based on the event, and modulating the image according to the calling mode.

Determining the calling mode may include determining the calling mode according to a degree of risk of the event or a security policy that is predetermined. The calling mode may include any of a videotelephony mode of performing calling with the image, a privacy calling mode of performing calling with a modulated image where a background region is masked, an all secured calling mode of performing calling with a modulated image where all regions of the image are masked, a partially secured calling mode of performing calling with a modulated image where a part of the background region is masked, a voice calling mode, and a call ending mode.

Starting the videotelephony may include performing the videotelephony by setting up one of the videotelephony mode and the privacy calling mode as a basic calling mode. The method may further include performing the videotelephony with the basic calling mode if it is determined that the event does not occur.

After determining the calling mode, the method may further include determining whether or not the calling mode is the call ending mode. After determining whether or not the calling mode is the call ending mode, the method may further include determining whether or not the calling mode is the voice calling mode.

In accordance with the embodiments of the present invention, the videotelephony image modulation apparatus and method has an effect of providing the secured calling mode for preventing information leakage by analyzing image information transmitted during the videotelephony and masking unnecessary information except information of the opposite party.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms should be defined throughout the description of the present invention.

Hereinafter, embodiments of the present invention will be described in detail with reference to the accompanying drawings so that they can be readily implemented by those skilled in the art.

Figure 1:
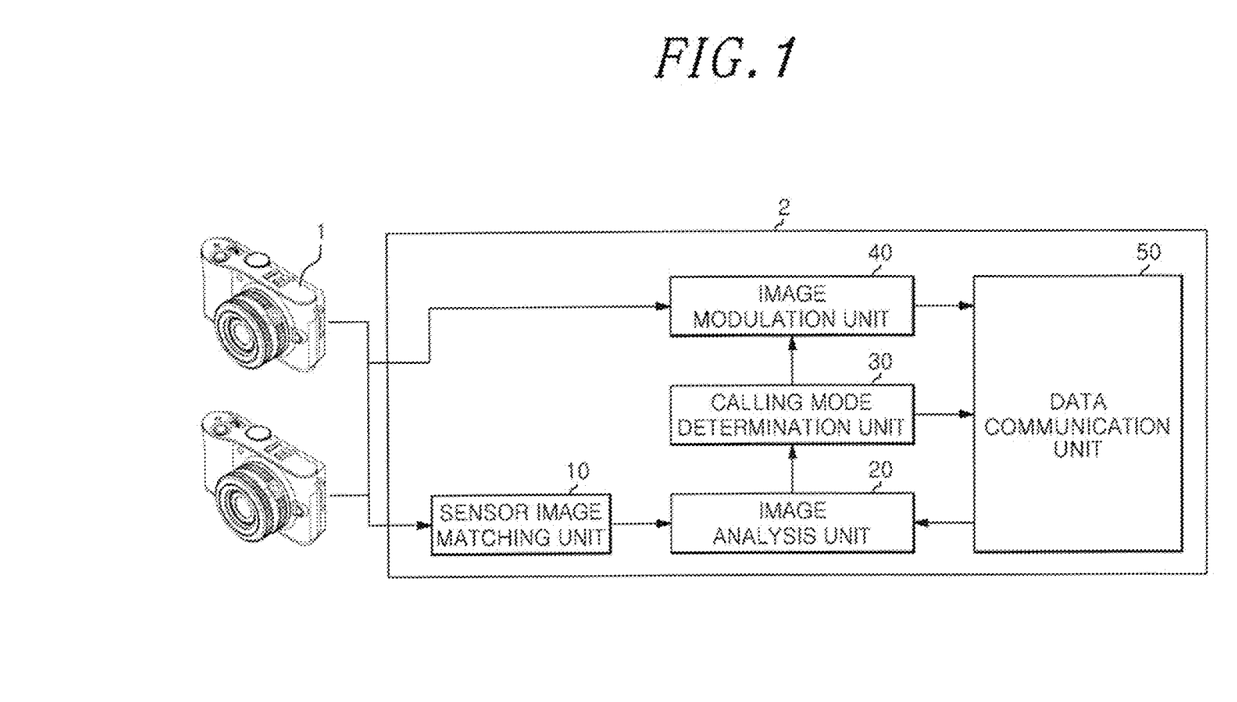
FIG. 1 illustrates a block diagram of a videotelephony image modulation device in accordance with an embodiment of the present invention.

FIG. 1 illustrates a block diagram of an image modulation device for videotelephony, i.e., a videotelephony image modulation device, in accordance with an embodiment of the present invention. FIGS. 2a to 2d are views for explaining a calling mode in accordance with an embodiment of the present invention.

Referring to FIG. 1, the videotelephony image modulation device 2 includes a sensor image matching unit 10, an image analysis unit 20, a calling mode determination unit 30, an image modulation unit 40, and a data communication unit 50. The sensor image matching unit 10 collects at least one image from a sensor or camera 1 and generates image information. Herein, the sensor may include a charged coupled device (CCD), a CMOS-based image sensor, an infrared sensor, a distance sensor, etc.

In particular, the sensor image matching unit 10 may secure a single image from one sensor or receive high dynamic range (HDR) images obtained through multiple exposure. The sensor image matching unit 10 may also secure a plurality of images from a plurality of sensors and match the images by analyzing location information between the images through the use of set-up information of each sensor and features of each image.

The sensor image matching unit 10 may secure a wide-angle image and perform mapping of image information of a certain region in the wide-angle image. For instance, in case of using a plurality of image sensors, it is possible to generate a depth map image using set-up information of each sensor and features of each image.

In addition, in case of using an image sensor and a thermographic camera, it is possible to generate an image on which a temperature is expressed. In case of using an image sensor providing a wide viewing angle and an image sensor capable of enlarging a certain region, it is possible to generate an enlarged image of a certain region in a wide-angle image. That is, the sensor image matching unit 10 may secure various images according to functions of a sensor and a camera and generate them as the image information.

The image analysis unit 20 analyzes the image information from the sensor image matching unit 10 and generates object and background region information. In particular, the image analysis unit 20 generates a location, a size, and a movement of an object existing in an image, and a distance from a camera as the object information, and generates regions except the object as the background region information. Herein, the object may include a face of a person and a text predefined by a user, a logo image of a company, a certain pattern, etc.

The image analysis unit 20 may include a sorter (not shown) capable of automatically sorting an object using a pattern recognition algorithm such as machine learning in case that a user predefines the object. In this case, the image analysis unit 20 may use a certain region of an entire region of images sequentially input thereto in the videotelephony as an input of the sorter and detect whether there exists the predefined object in the images, thereby generating the object information.

The calling mode determination unit 30 detects an event using the object and background region information and determines a calling mode based on the detected event. Herein, the event may include disappearance of a person talking on a videotelephone, growing-away of the person talking on the videotelephone, appearance of a new person, detection of the predefined object, information leakage, privacy invasion, etc.

In particular, if information of a face that is detected from an image input thereto when the videotelephony is started using a face detection technology and location information of the face detected from a subsequent image deviate from a screen or a predetermined region, the calling mode determination unit 30 determines such a case as the event that the person talking on the videotelephone, i.e., a sender or a receiver, disappears.

In the calling mode determination unit 30, a distance of a person from a camera, which is detected from the image input thereto when the videotelephony is started, is traced in subsequent images sequentially input thereto. As a result, and, if the distance deviates from a predetermined distance range, the calling mode determination unit 30 determines such a case as the event that the person talking on the videotelephone grows away from the videotelephone. If another face region is detected in addition to the face detected when the videotelephony is started, the calling mode determination unit 30 determines such a case as the event that a new person appears.

The calling mode determination unit 30 analyzes the object and background region information, and, if the object defined by the user is detected as a result of the analysis, determines it as an event. The calling mode determination 30 maps texts and images extracted by analyzing the object and background region information to keywords, patterns, image patterns, etc., which are predefined, and, if there is a mapped result, determines such a case as an event that information is able to be leaked.

The calling mode determination unit 30 pre-establishes a degree of risk for each event through a manager or automatically sets up the degree of risk according to a size or type of an object, the importance of information, etc. If an event occurs, a calling mode can be determined according to a degree of risk of the event and a security policy. Herein, the security policy is defined by the manager, and includes rules for a basic calling mode at the beginning of the videotelephony, the authority of a user, a degree of risk of a security event, a calling mode according to the degree of risk of the security event, etc.

Figure 2A:
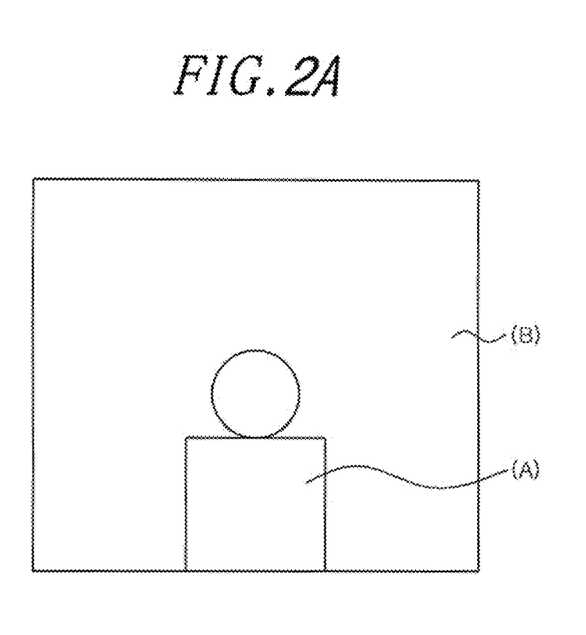
FIGS. 2a to 2d are views for explaining a calling mode in accordance with an embodiment of the present invention.
Figure 2B:
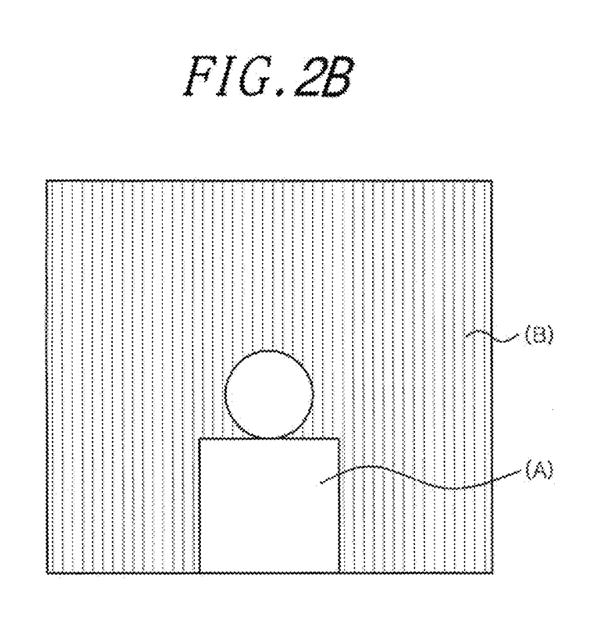

In accordance with an embodiment of the present invention, calling modes include a videotelephony mode, a privacy calling mode, an all secured calling mode, a partially secured calling mode, a voice calling mode, a call ending mode, etc. For instance, the videotelephony mode is a mode of performing calling with a screen of an image including an object A and a background region B as shown in FIG. 2a. The privacy calling mode is a mode of performing calling with a screen of an image where the background region B is masked as shown in FIG. 2b.

Figure 2C:
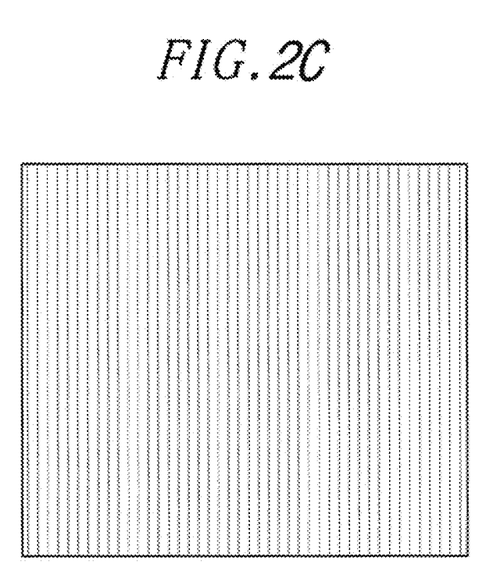
Figure 2D:
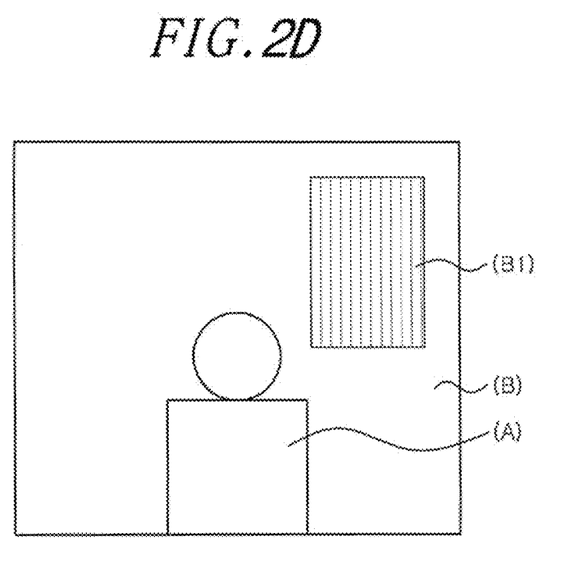

The all secured calling mode is a mode of performing calling with a screen of an image where all of the object A and the background region B are masked as shown in FIG. 2c. The partially secured calling mode is a mode of performing calling with a screen of an image where a sub-region B1 of the background region B is masked as shown in FIG. 2d.

Referring back to FIG. 1, the image modulation unit 40 generates a modulated image by selectively masking an image according to a calling mode determined by the calling mode determination unit 30. In particular, the image modulation unit 40 performs image processing, such as modification of pixel values, mosaic or blurring obscuring an image, and the like, on a selected region of the image, and generates the modulated image where the selected region is not identified. The data communication unit 50 performs communications with a base station to execute the videotelephony.

Figure 3:
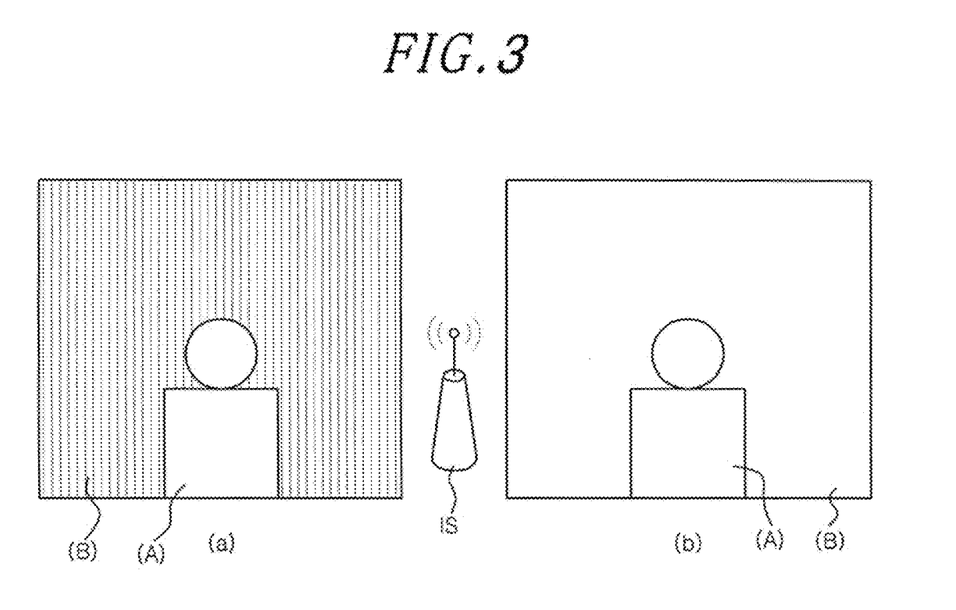
FIG. 3 is a view for explaining a case that a sender and a receiver perform videotelephony in different calling modes using a videotelephony image modulation device in accordance with an embodiment of the present invention.

FIG. 3 is a view for explaining a case that a sender and a receiver perform the videotelephony in different calling modes using a videotelephony image modulation device in accordance with an embodiment of the present invention. FIG. 3(a) represents a screen of the sender, and FIG. 3(b) represents a screen of the receiver.

Referring to FIG. 3, the sender can execute the videotelephony with the receiver in a privacy calling mode via a base station IS. That is, in case that an object having a possible of information leakage or privacy invasion is detected in a background region of the sender, the calling mode determination unit 30 transfers a modulated image where the background region of the sender is masked to the receiver.

Herein, the calling mode determination unit 30 is able to establish the videotelephony mode or the privacy calling mode as a basic calling mode according to the security policy when starting the videotelephony. At this time, the calling mode determination unit 30 may provide the user with authority to select the basic calling mode or may not provide the user with authority of changing the established basic calling mode, according to the security policy.

Figure 4:
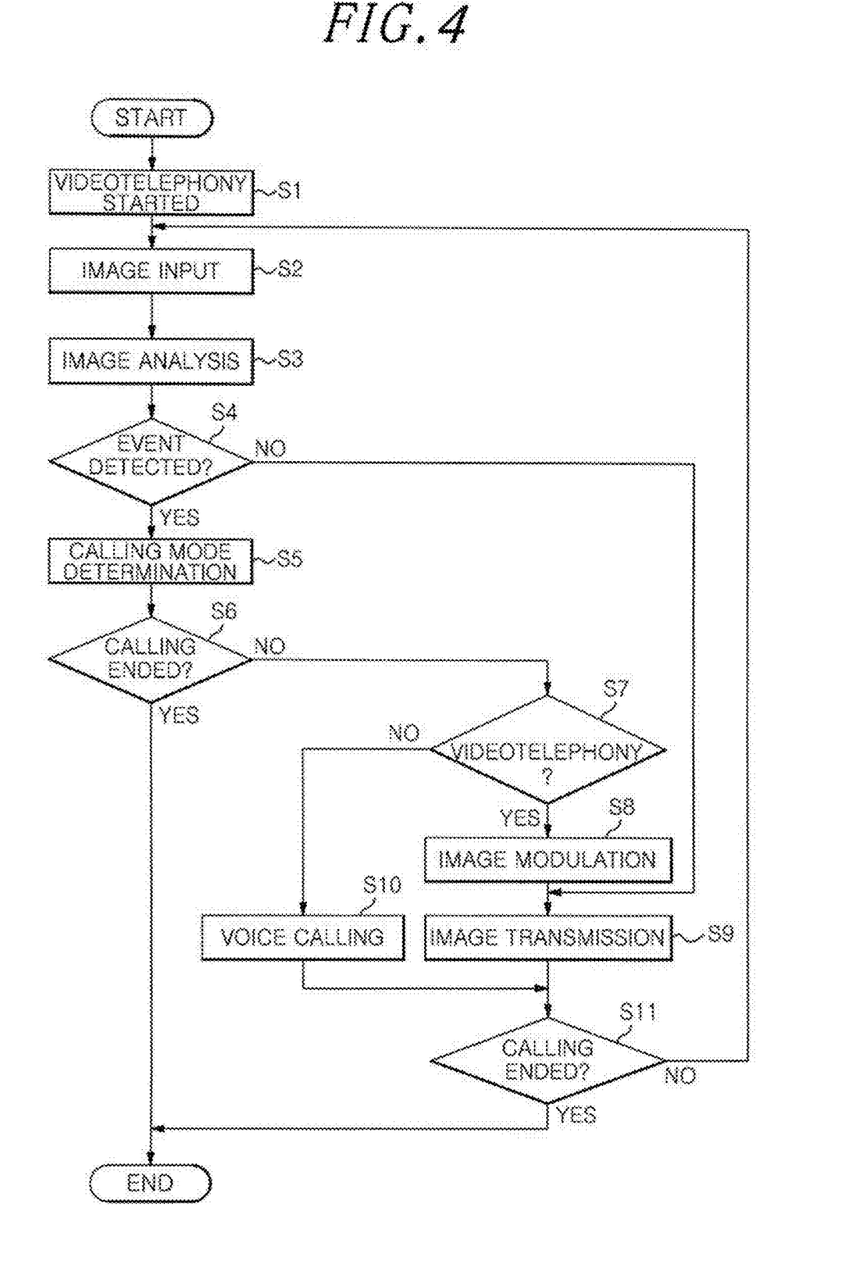
FIG. 4 is a flowchart illustrating a videotelephony image modulation method in accordance with an embodiment of the present invention.

FIG. 4 is a flowchart illustrating a videotelephony image modulation method in accordance with an embodiment of the present invention. FIGS. 5a to 5d are views for explaining a method of changing a calling mode in accordance with an embodiment of the present invention.

Referring to FIGS. 1 and 4, in step S1, the videotelephony is started. At this time, for instance, a videotelephony mode is established as a basic calling mode. After that, in step S2, the sensor image matching unit 10 collects at least one image from the sensor or camera 1 and generates image information. Subsequently, in step S3, the image analysis unit 20 analyzes the image or the image information and generates object and background region information. Then, in step S4, the calling mode determination unit 30 detects whether or not an event occurs using the object and background region information.

Figure 5A:
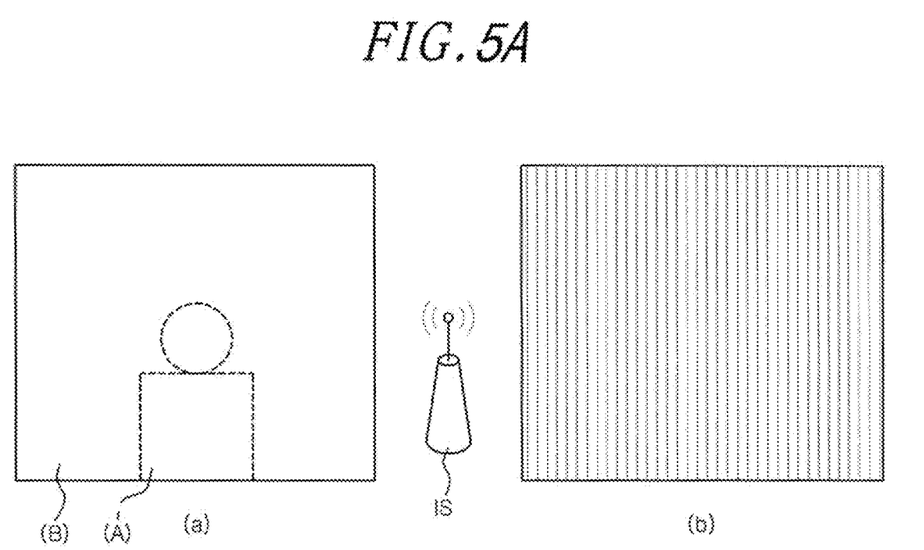
FIGS. 5a to 5d are views for explaining a method of changing a calling mode in accordance with an embodiment of the present invention.
Figure 5B:
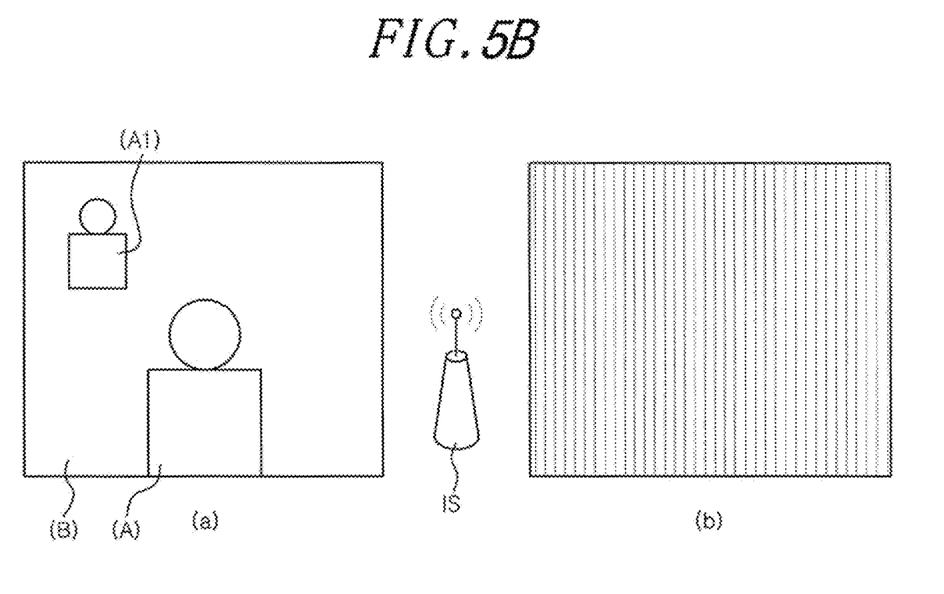

As a result of the detection in step S4, if the event is detected, in step S5, the calling mode determination unit 30 determines a calling mode. For instance, as shown in FIG. 5a, in case of detecting an event where an object talking on a videotelephone disappears in an image (a) of a sender, the calling mode determination unit 30 may change the calling mode to an all secured calling mode. Meanwhile, as shown in FIG. 5b, in case of detecting an event where a new object A1 appears in the image (a) of the sender, the calling mode determination unit 30 may change the calling mode to the all secured calling mode.

Figure 5C:
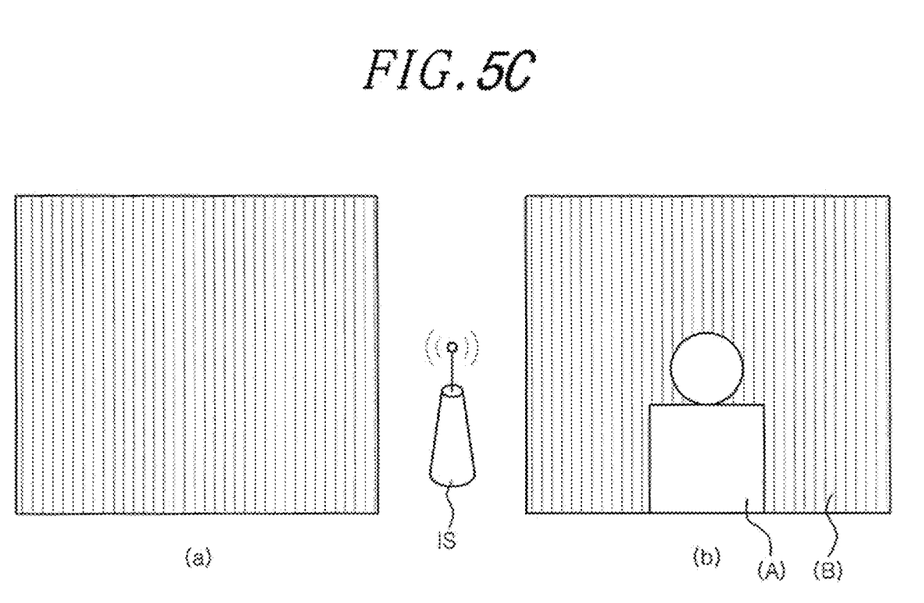

As shown in FIG. 5c, in case of detecting an event where privacy invasion can occur in the image (a) of the sender, the calling mode determination unit 30 may change the calling mode to a privacy calling mode. At this time, in case of detecting an event having a high degree of risk and a high possibility of information leakage in an image (b) of a receiver, the calling mode determination unit 30 may change the calling mode to the all secured calling mode.

Figure 5D:
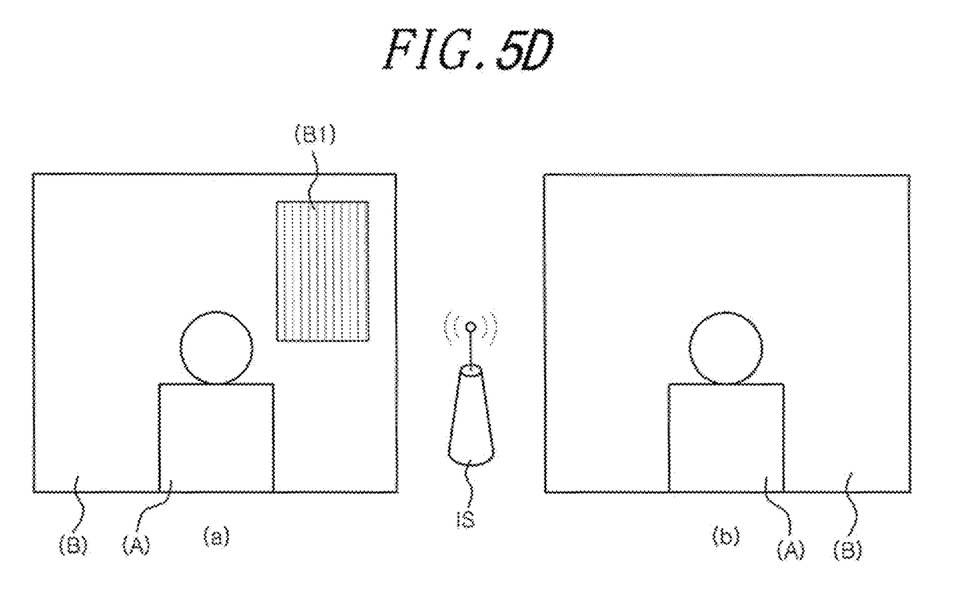

As shown in FIG. 5d, in case of detecting an event where an established object appears in a part of a background region of the image (a) of the sender, the calling mode determination unit 30 may change the calling mode to a partially secured calling mode.

After that, in step S6, the calling mode determination unit 30 determines whether or not the changed calling mode is a call ending mode. As a result of the determination, if the calling is not terminated, i.e., the changed calling mode is not the call ending mode, in step S7, the calling mode determination mode 30 determines whether the determined calling mode is a voice calling mode or a videotelephony mode. As a result of the determination, in case of the videotelephony mode, in step S8, the image modulation unit 40 modulates the image according to the determined calling mode and generates a modulated image.

Subsequently, in step S9, the data communication unit 50 transmits the modulated image to the sender via a base station. For instance, in case of FIG. 5a and FIG. 5b, the receiver may receive a modulated image where the object A and the background region B are masked. In case of FIG. 5c, the receiver may receive a modulated image where the background region B is masked. At this time, the sender may receive a modulated image where the object A and the background region B are masked. In case of FIG. 5d, the receiver may receive a modulated image where a partial region B1 of the background region B is masked.

As a result of the determination in step S4, if an event is not detected, the calling mode determination unit 30 transmits the image to the data communication mode 50. After that, the data communication unit 50 proceeds to step S9. As a result of the determination in step S6, if the changed calling mode is determined to be the call ending mode, the calling is terminated. As a result of the determination in step S7, if the calling mode is determined to be the voice calling mode, in step S10, the voice calling is performed. Then, after performing step S9 or S10, in step S11, the calling mode determination unit 30 determines whether or not the calling mode is the call ending mode. If the calling mode is determined to be the call ending mode, the calling is terminated. In step S11, if it is determined that the calling mode is not the call ending mode, the sensor image matching unit 10 proceeds to step S2 to receive an image.

As described above, a videotelephony image modulation apparatus and method in accordance with the embodiments of the present invention may provide a calling mode for preventing information leakage by analyzing image information transmitted during the videotelephony and masking unnecessary information except information of an opposite party.

In addition, in accordance with the embodiments of the present invention, a calling mode is automatically controlled according to an event related to security and the security policy. As a result, it is possible to prevent in advance privacy from being invaded or information being leaked through the videotelephony, thereby enhancing the security.

Moreover, it is possible to effectively control a calling mode by providing various calling modes such as a videotelephony mode, a privacy calling mode, an all secured calling mode, a partially secured calling mode, a voice calling mode, and a call ending mode through the use of a degree of risk of an event and the security policy.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. An apparatus for modulating images for videotelephony, the apparatus comprising:
   a sensor image matching unit configured to collect an image from at least one sensor or camera and generate image information;
   an image analysis unit configured to analyze the image information and generate object and background region information;
   a calling mode determination unit configured to detect an event using the object and background region information and determine a calling mode based on the event; and
   an image modulation unit configured to modulate the image according to the calling mode and generate a modulated image,
   wherein the calling mode comprises a privacy calling mode of performing calling with a modulated image where a background region is masked, an all secured calling mode of performing calling with a modulated image where all regions of the image are masked, and a partially secured calling mode of performing calling with a modulated image where a part of the background region is masked.

2. The apparatus of claim 1, wherein the calling mode determination unit is configured to determine the calling mode according to a degree of risk of the event or a security policy that is predetermined.

3. The apparatus of claim 1, wherein the calling mode comprises any of a videotelephony mode of performing calling with the image, a a voice calling mode, and a call ending mode.

4. The apparatus of claim 3, wherein the calling mode determination unit is configured to set up one of the videotelephony mode and the privacy calling mode as a basic calling mode.

5. The apparatus of claim 4, wherein the calling mode determination unit is configured to change the basic calling mode to one of the videotelephony mode, the privacy calling mode, the all secured calling mode, the partially secured calling mode, the voice calling mode, and the call ending mode, according to the event.

6. A method of modulating images for videotelephony, the method comprising:
   starting the videotelephony;
   collecting an image from at least one sensor or camera and generating image information;
   analyzing the image information and generating object and background region information;
   determining whether or not an event occurs using the object and background region information;
   determining a calling mode based on the event; and
   modulating the image according to the calling mode,
   wherein the calling mode comprises a privacy calling mode of performing calling with a modulated image where a background region is masked, an all secured calling mode of performing calling with a modulated image where all regions of the image are masked, and a partially secured calling mode of performing calling with a modulated image where a part of the background region is masked.

7. The method of claim 6, wherein determining the calling mode comprises determining the calling mode according to a degree of risk of the event or a security policy that is predetermined.

8. The method of claim 6, wherein the calling mode comprises any of a videotelephony mode of performing calling with the image, a voice calling mode, and a call ending mode.

9. The method of claim 8, wherein starting the videotelephony comprises performing the videotelephony by setting up one of the videotelephony mode and the privacy calling mode as a basic calling mode.

10. The method of claim 9, further comprising performing the videotelephony with the basic calling mode if it is determined that the event does not occur.

11. The method of claim 9, after determining the calling mode, further comprising determining whether or not the calling mode is the call ending mode.

12. The method of claim 11, after determining whether or not the calling mode is the call ending mode, further comprising determining whether or not the calling mode is the voice calling mode.

* * * * *